Oct. 13, 1959     E. A. HODGE     2,908,240
SEAPLANE BEACHING APPARATUS
Filed Feb. 7, 1956     4 Sheets-Sheet 1
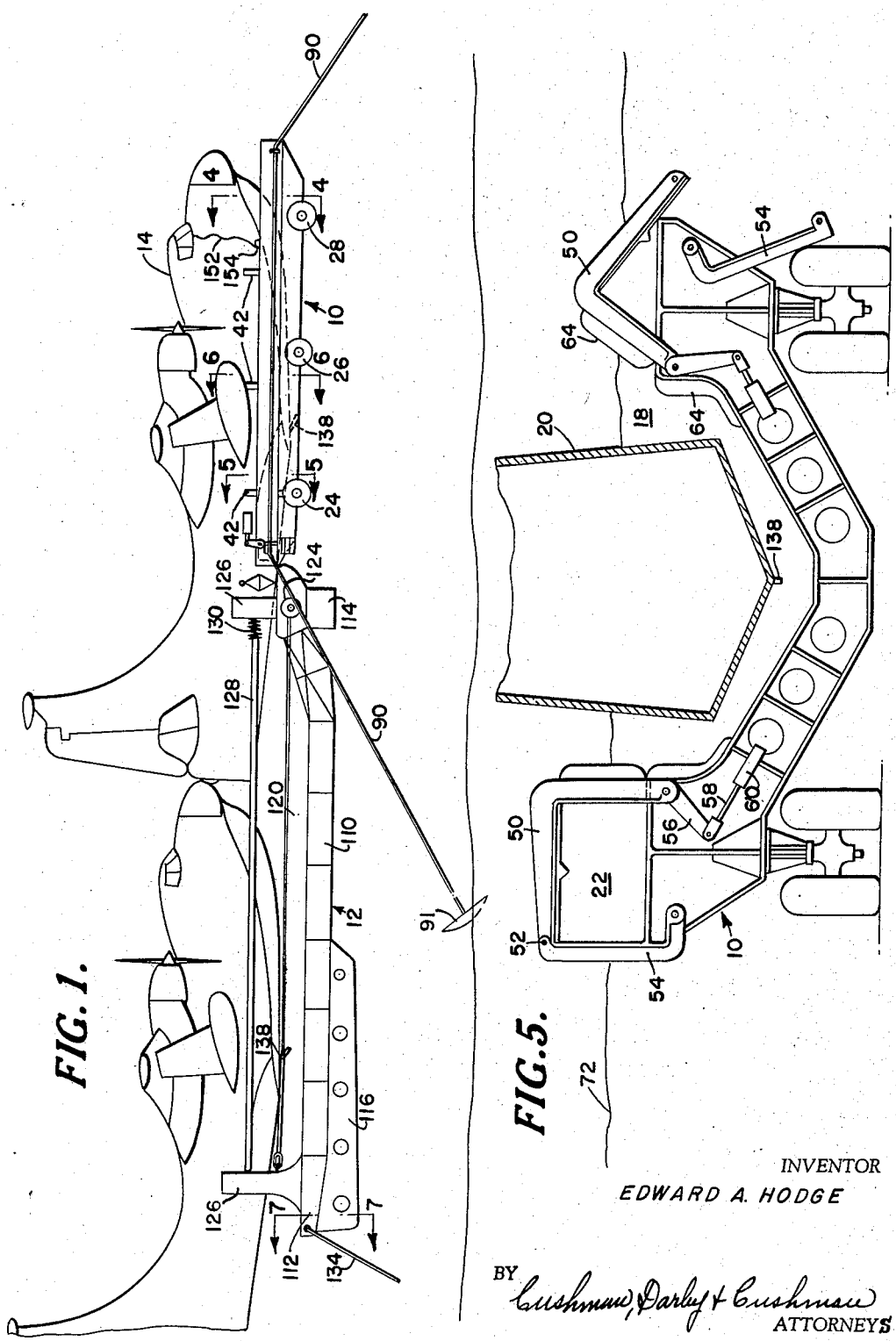
INVENTOR
EDWARD A. HODGE
BY Cushman, Darby & Cushman
ATTORNEYS

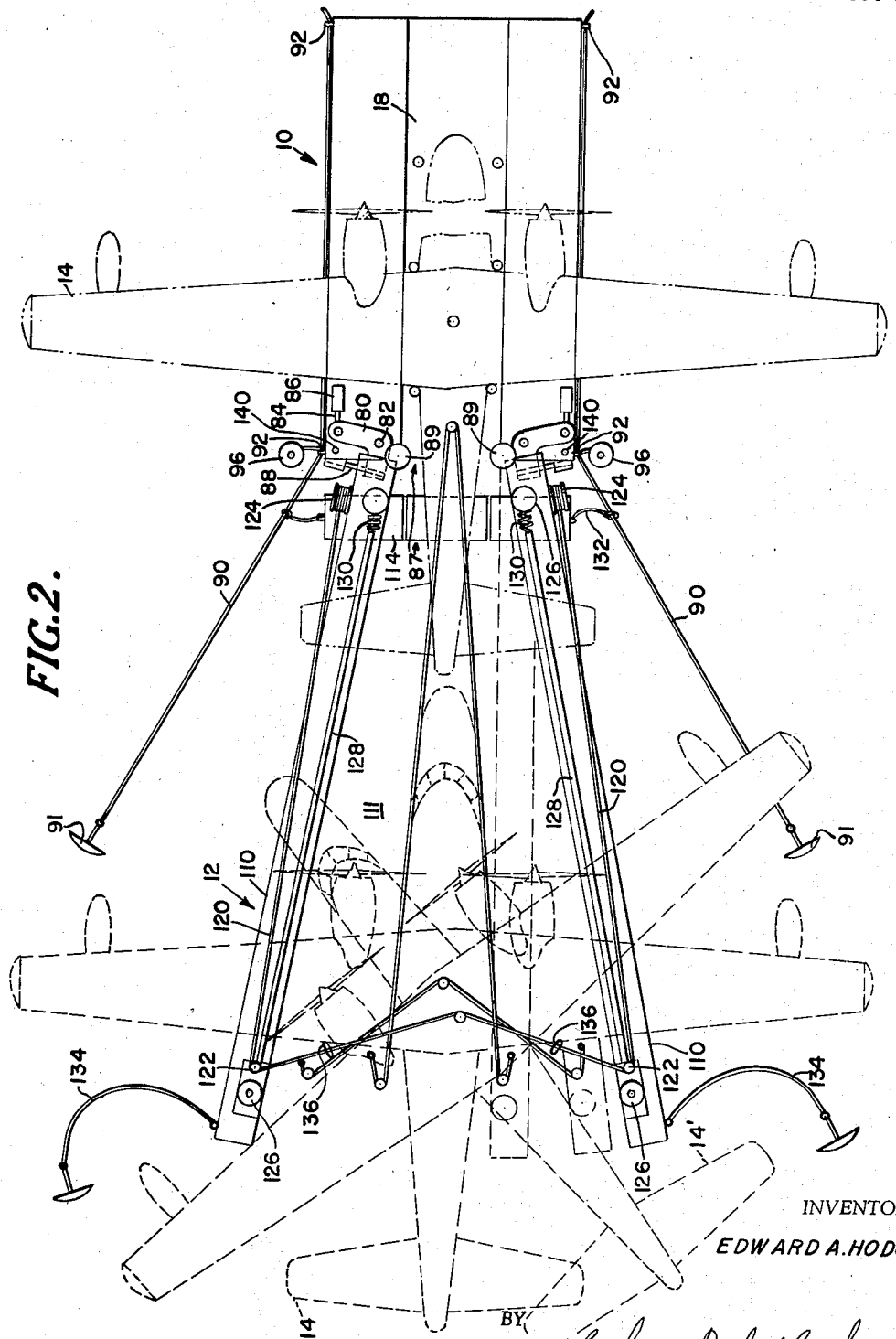

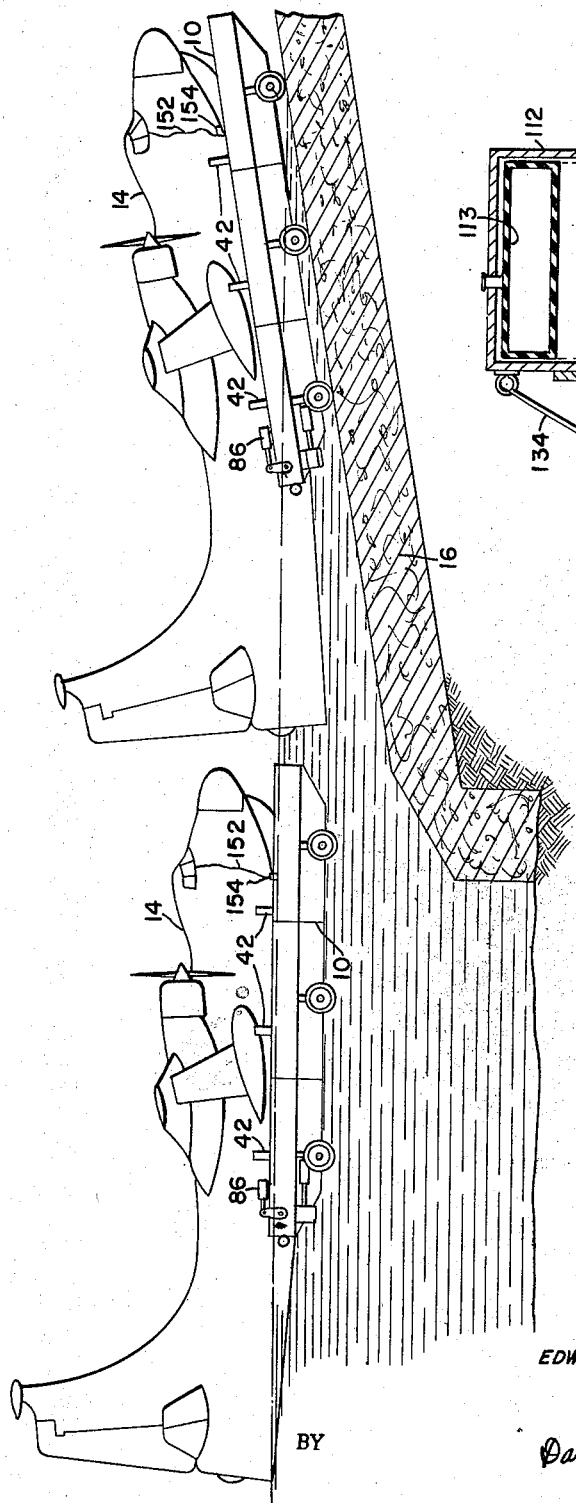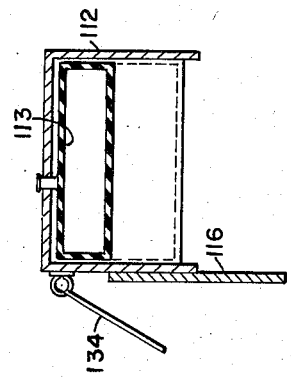

Oct. 13, 1959     E. A. HODGE     2,908,240
SEAPLANE BEACHING APPARATUS

Filed Feb. 7, 1956     4 Sheets-Sheet 4

INVENTOR
EDWARD A. HODGE
BY Cushman, Darby & Cushman
ATTORNEYS

United States Patent Office 2,908,240
Patented Oct. 13, 1959

2,908,240

SEAPLANE BEACHING APPARATUS

Edward A. Hodge, Montchanin, Del., assignor, by mesne assignments, to The Martin Company, Baltimore, Md., a corporation of Maryland Application February 7, 1956, Serial No. 564,007

13 Claims. (Cl. 114—43.5)

This invention relates to seaplane beaching apparatus. For the purpose of this description, the expression "beaching apparatus" will be deemed to include apparatus for use with water-borne seaplanes or amphibian planes so that the aircraft may be moved from the water to land, and the expression should be deemed to include suitable appurtenances and auxiliary equipment used, in combination, to effect the beaching of the water-borne craft. While the beaching apparatus described hereinbelow is primarily for use in beaching aircraft, the invention is not necessarily limited to such utility and it may be used for beaching any water-borne craft.

While some seaplanes are designed to float on separate pontoons depending from the underside of the aircraft, the more modern trend is to construct the fuselage so that it acts as a hull to support the aircraft on the water and seaplanes of this variety are sometimes termed "flying boats." While the fuselages on these aircraft are usually so constructed as to be somewhat stronger than the corresponding member on a conventional aircraft, the hull portions are nevertheless relatively weak and fragile and are not capable of sustaining large amounts localized stress and must be handled with care to avoid injury which will destroy the watertight integrity of the hull.

Inasmuch as it is difficult and expensive to service, arm, or load any seaplane on the water, it is considered desirable to have facilities for bringing the plane to a service area on land before undertaking such activity. Most usually a flying boat is fitted with some type of beaching apparatus and then pulled up a marine ramp, either by a winch or a tractor, with or without assistance from the aircraft prime mover.

At the present time, the most widely used beaching apparatus consists of single beaching wheels which are secured on either side of, and under the nose of, the hull. These beaching wheels consist of a pneumatically tired wheel rotatably mounted on an axle fixed at, or near, one end of a spring or hydraulically loaded telescoping strut. Fixed to, or near, the other end of the strut, is a flotation cell having sufficient buoyancy to support the entire structure in water.

In accordance with modern practice, the plane is maneuvered or towed into a position closely adjacent the marine ramp, and then each wheel is floated to the plane, mandhandled into position by swimmers, and then secured to special fittings (some of which are under water) on the hull of the flying boat. This procedure has never been entirely satisfactory in that it requires a large standby crew and is quite time consuming, particularly when the water is rough or when the currents are strong. Further, as the plane must be maneuvered into shallow water before the installation of such beaching gear is commenced, there is always some danger that the craft will be borne, by unexpected breezes or currents, onto shore and damaged. It will be evident that this procedure is quite arduous in frigid zones where the swimmers cannot enter the water and the entire procedure must be effected from lighters or skiffs.

As seaplanes have become larger, the use of this procedure has become more difficult, and hence, more time consuming and more expensive, as well as more dangerous for the personnel involved. As the beaching wheels become larger, and, therefore, heavier, there is an increased danger that a floating cell, or some other member, will be thrown by wave action against the thin hull skin whereby the latter is pierced and the water-tight integrity of the hull is destroyed. Another disadvantage of this method stems from the fact that each seaplane base using beaching equipment of this general type must stock, maintain, and service a large number of types and sizes of such beaching wheels because many planes can only be fitted with their own specially dimensioned and designed beaching wheels, which are frequently unsuited for use on any other type or model of aircraft.

It is, therefore, within the contemplation of this invention to provide improved apparatus for safely beaching large, heavy seaplanes of the flying boat variety. The apparatus disclosed by this invention may be operated and maintained by a relatively small crew, and is suitable for use in any climate or on the high seas when it is desired to beach an aircraft onto a ship, such as a mobile marine dry dock having a submerged, or partially submerged, marine ramp.

It is, therefore, an object of this invention to provide improved beaching apparatus for large flying boats which may be operated with completely safety by a relatively small crew.

It is a further object of this invention to provide improved apparatus for large flying boats which may be quickly and easily operated a considerable distance from shore or upon the high seas.

It is another object of this invention to provide improved beaching apparatus for large flying boats which may be operated without danger of injury to the aircraft.

It is another object of this invention to provide improved beaching apparatus for large flying boats which can be quickly engaged to the aircraft so that the entire beaching procedure may be effected with dispatch.

It is another object of this invention to provide improved beaching apparatus for large flying boats which may be used for beaching any of a large number of models or type of flying boats and, further, which may be quickly and easily modified to be suitable for use with almost every known type of flying boat.

It is another object of the invention to provide improved beaching apparatus for large flying boats which can be used in frigid zones.

These and other objects of this invention will be fully understood from the following detailed description of a typical preferred form and application of the invention, throughout which description reference is made to the accompanying drawings in which:

Figure 1 is an elevational view of the breasting-in gear coupled to a beaching cradle in accordance with this invention, and illustrates a flying boat engaging the retarding cable of the breasting-in rig and further illustrates the flying boat finally positioned with the cradle;

Figure 2 is a plan view of the breasting-in gear coupled to a beaching cradle in accordance with this invention, and illustrates, in phantom, a flying boat in various positions as will be encountered in practice;

Figure 3 is a side elevational view of a flying boat secured to a beaching cradle in accordance with this invention, and being taxied on water and up a marine ramp;

Figure 5 is a section taken on lines 5—5 of Figure 1;

Figure 7 is a section taken on lines 7—7 of Figure 1.

Referring to Figures 1 and 2, it will be seen that the beaching apparatus of this invention is, generally speaking divisible into two separate parts, a cradle 10 and a breasting-in rig, generally indicated at 12. In operation, the cradle and the breasting-in rig are secured together and anchored a short distance from shore. The aircraft 14 is taxied into the breasting-in rig where it is aligned, by means which will be described in detail hereinafter, with the well of the cradle and is then taxied thereinto where it is fixed in position by securing means mounted on the cradle.

The cradle is then detached from the breasting-in rig 12 and the aircraft's propellers are used to taxi the aircraft, and the cradle on which it rests, and to which it is fixed, up a beach or a marine ramp 16 (Fig. 3).

The cradle

Figure 4:
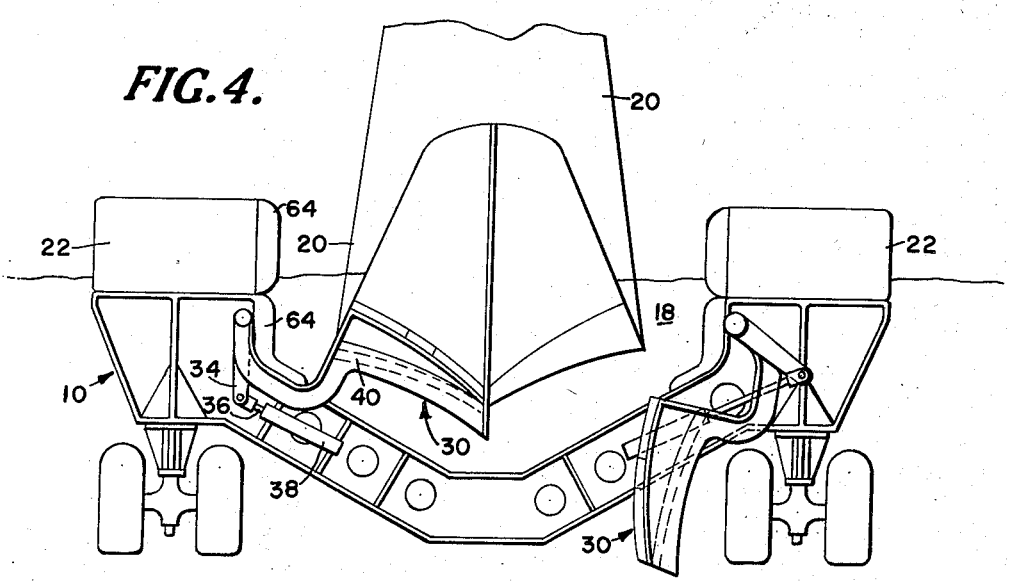
Figure 4 is a section taken on lines 4—4 of Figure 1.
Figure 6:
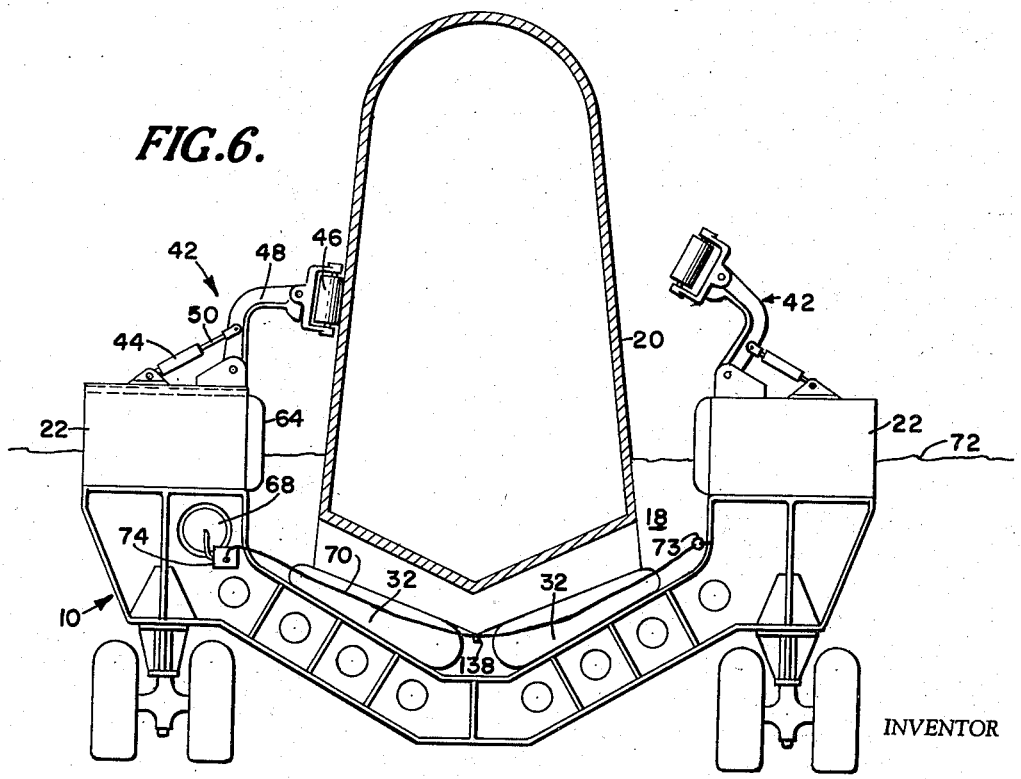
Figure 6 is a section taken on lines 6—6 of Figure 1.

Referring to Figures 4, 5 and 6, it will be seen that the configuration of the elongated beaching cradle varies somewhat along its length, but that it has a general U-shaped cross section with the opening between the legs being of a size and shape to define a well 18 to receive the hull 20 of a modern flying boat 14. The beaching cradle 10 is fabricated from ordinary structural members and is provided with a number of removable pontoons or flotation cells 22, affixed to the upper or free ends of the legs of the U. The pontoons 22 provide sufficient buoyancy to maintain the cradle on or near the surface of the water, with the cradle in a semi-submerged position. Affixed to, and depending from, the underside of the beaching cradle 10 are a number of wheels and, in a preferred embodiment, there are three sets of wheels 24, 26 and 28, the latter set being pivotally mounted and provided with pneumatic, hydraulic, or other means, for selectively steering the beaching cradle when it is landborne.

Referring to Figures 4, 5 and 6, in which there are illustrated different vertical sections of the beaching cradle 10 and including fragmentary views of the hull 20 of a conventional flying boat 14, it will be seen that the well 18 of the beaching cradle is provided with pneumatically operated chocking levers, generally indicated at 30 (Fig. 4), as well as with pneumatically inflatable chocking pads 32 (Fig. 6) and pneumatically operated shores 42 (Fig. 6). The chocking levers 30 are made up of a pivotally mounted rocker member having one arm 34 connected with a reciprocable piston 36 of a pneumatic cylinder 38, and having another arm 40 suitably padded and shaped to conform to the configuration of the underside of the hull 20 of a flying boat 14 when the chocking lever is operatively positioned fast in engagement therewith. In Figure 4 one chock 30 is illustrated operatively engaged with the hull 20 of a flying boat 14 while the other is illustrated in a relaxed, or inoperative, position. As will be understood, this illustration merely shows the alternate positions of the chocks 30, and it is within the contemplation of this invention that both chocks will be operative simultaneously.

Referring more particularly to Figures 1 and 6, the beaching cradle 10 is provided with several sets of transversely opposed pneumatically or hydraulically operating shores, generally indicated at 42, which are here illustrated as actuated by pneumatic cylinders 44 to bear against the sides of the hull 20 of the flying boat 14 and to hold the latter against any lateral displacement or shifting. In a preferred embodiment, the shores 42 consist of suitably cushioned roller pads 46 fixed on a free end of an L-shaped lever 48 pivotally mounted at a second free end and connected with a reciprocable piston 50, of the pneumatic cylinder 44, the piston being connected to the lever 48 intermediate the free padded end and the pivoted end.

In Figure 6 one shore 42 is illustrated operatively engaged with the hull 20 of a flying boat 14 while the other is illustrated in a relaxed, or inoperative, position. As will be understood, this illustration merely shows the alternate positions of the shores 42, and it is within the contemplation of this invention that both shores will be operative simultaneously.

Referring further to Figure 6, an inflatable chocking pad 32 is installed in the floor, or bottom, of the well 18 of the cradle 10, preferably at a location where it will, when inflated, engage the undersurface of the hull 20 at, or near, its lowermost point, i.e., the step. The inflatable pad 32 is constructed, dimensioned and arranged to remain clear of the hull 20 when deflated.

Referring to Figure 5, it will be seen that each of the pontoons 22 is secured on the beaching cradle 10 by an L-shaped pontoon securing frame 50, which has the free end of one leg engageable, by pin 52, with a pivotally mounted locking member 54 and has the free end of the other leg engaged, by means of operating arm 56, to the reciprocable piston 58 of pneumatic cylinder 60. It will be readily seen that the selective withdrawal of the piston 58 within the cylinder 60 will raise that end of the operation arm 56, which is engaged to the securing frame 50, and hence will serve to move the locking member 54 to a position whereby the pin 52 may be easily released so that the pontoon 22 can be removed for replacement or repair.

In Figure 5 one pontoon securing frame 50 is illustrated detached from its locking member 54, although this would not be the usual practice when aircraft is in the cradle.

As shown in Figures 4, 5 and 6, the sidewalls of the well, defined by the mesial surfaces of the beaching cradle 10 and the pontoons 22, are covered with a suitable padding 64 to prevent strike injury to the hull 20 of the aircraft 14 when the latter is taxied into the cradle in the manner that will be described hereinafter.

Referring to Figure 6, an actuating cable 70 is suspended transversely across the well at a level considerably under water level 72 at a point approximately midway of the longitudinal length of the beaching cradle, although the longitudinal placement may vary somewhat, depending upon the size and configuration of the flying boat being beached. The cable 70 has one bight secured to any fixed point, such as eye bolt 73, and has the other bight secured, by any suitable means, to an actuating valve 74 which intersects a conduit (not shown) between an air flask 68 (Fig. 6) and the pneumatic cylinders 38 and 44 and the pneumatic chocking pad 32. As will be discussed in detail hereinafter, the movement of the aircraft into the well 18 of the beaching cradle 10 tenses this cable and thus actuates the valve 74 to energize the various chocking and shoring means described hereinabove, as well as other apparatus which will be described hereinafter.

Referring to Figure 2, an L-shaped lever 80, pivotally mounted on pin 82 at the intersection of the legs of the L, is mounted on the upper surface of each side wall of the cradle near one end. For reasons which will be described in detail hereinafter, each lever 80 has the piston 84 of a pneumatic cylinder 86, or other yielding tensioning means, secured to one leg so that the entire lever is selectively yieldingly urged to maintain a certain angular position relative to fixed pin 82. This atcion is selective inasmuch as the cylinders, or other tension means, are arranged to hold the lever in the predetermined position only up to a time when the lever is subjected to a predetermined rotating force. The other leg of each lever 80 is provided with a pneumatically retractable pin 88 which engages a member of the breasting-in rig as will be described.

At the same end of the cradle 10, which will be hereinafter termed the entrance, generally indicated at 87, the innermost corners of the cradle, that is to say, the corners of the mesial surfaces which define the well 18, are provided with suitable bumpers 89 (Fig. 2) to prevent damage to the hull 20 of an aircraft 14 being taxied therein in a manner which will be described hereinafter.

It is within the contemplation of this invention that the beaching cradle 10 may be anchored in position by a pair of anchor cables 90 (Figure 1), each having an anchor 91 on its free ends and secured to the distal sides of the beaching cradle 10 by releasable latches 92 mounted on the cradle. Each anchor cable 90 has a buoy 96 attached thereto. The latches 92 may be pneumatically operated, in any conventional manner, to release the anchor cables 90 when the actuating cable 70 is tripped by the entrance of the aircraft into the well 18 of the cradle 10, or may be operated by hand.

*Breasting-in rig*

Referring to Figures 1 and 2, it will be seen that the breasting-in rig consists essentially of a pair of spaced outrigger spars 110, each having one end fitted for engagement with the levers 80 by means of the pins 88. The outrigger spars 110 define a bay 111, which, as will be explained hereinafter, has a size and shape that varies with the positions of the spars. Each of the outrigger spars 110 has a buoyancy tank 112 fixed to, or made integral with, the free end thereof. A buoyant girder 114 which consists of an elongated flotation cell, is loosely connected, by any suitable means, with each of the outrigger spars 110 at a point adjacent the ends which are engageable with the beaching cradle 10.

Referring to Figure 7, it will be seen that each buoyancy tank 112 is, in a preferred embodiment, formed as a bottomless box-like structure. A flexible flotation cell 113 is dispersed within the tank 112 and fixed at or near the upper surface thereof. Air, from air cask 68, on the beaching gear 10, or from other source, may be piped by a pressure hose or conduit (not shown) into the buoyancy tanks 112 to selectively inflate the flotation cells 113 and thus selectively control the depth that will be maintained by the free ends of the outrigger spars 110. In Figure 7, the flotation cell is illustrated as being partially inflated, with its shape when fully inflated being illustrated in phantom.

Of course, it is within the contemplation of the invention that the buoyancy tanks 112 may be completely closed, and provided with selectively controlled water ballasting means, or may be otherwise arranged. It is also within the contemplation of the invention that buoyant girder 114 may also be provided with an inflatable flotation cell similar in structure and operation to flotation cell 113. Each of the outrigger spars 110 are of open type construction so as to reduce the effect of wave action. Each spar 110 has a keel 116 fixed to, or made integral with, the underside thereof so as to give the desired stability and to offer resistance against the tendency of the spars to swing toward each other. When the breasting-in rig is used in combination with the cradle and is secured thereto by the pins 88, passing through suitable fittings on the ends of the spars, the pneumatic cylinders 86 maintain the levers 80, and hence, the outrigger spars 110, in the desired position, that is to say, in position where the spars diverge with each disposed at an angle of about 15° to the center line of the breasting-in rig 12 and the beaching cradle 10.

A retarding cable 120 is rove about sheaves 122, located adjacent the free ends of the spars 110, and spans the opening between these ends. Each free end of the cable 120 is wound about a stressing winch 124, one of which is fixed to each of the spars. In the preferred embodiment illustrated, the stressing winches 124 are disposed near the cradle end of the outrigger spars 110 but, if desired, they can be placed at any convenient location along the length of the spar. An upstanding fender post 126 is mounted on each end of each of the spars 110, and there is a fender cable 128, stressed by tension springs 130, extending between each post of a given spar. As will be discussed hereinafter, these fender cables 128 serve to resiliently retard and guide aircraft being taxied into the bay 111 defined by the spars 110.

A line 132 extends from each end of the buoyant girder 114 to the corresponding anchor cable 90, and the free ends of each of the spars are anchored by cable 134, the latter being loosely arranged to allow the spars 110 to swing together, as will be described hereinafter.

*Operation*

It is within the contemplation of this invention that the beaching cradle 10 and the breasting-in rig 12 should be aligned with one another, anchored, and joined together by the insertion of the pins 88 of the levers 80 into the fitting on the outrigger spars 110. At such time the chocking lever 30 and the shores 42 should be in their released or inoperative position and the inflatable chocking pad 32 should be deflated. Each of the pneumatic cylinders 86 is operated to swing the spars, by the rotation of lever 80 about pin 82, to a position wherein each spar is disposed at an angle of approximately 15° to the center line of the breasting-in rig 12 and the beaching cradle 10, although the exact angle or spread of the individual spars 110 may be widely varied, depending upon the length of the spars, the size of the airplane to be accomodated and various other factors. The retarding cable 120 is made taut by a suitable manipulation and setting of the stressing winches 124. The portion of the taut cable 120 spanning the bay 111 defined by the free, or spread, ends of the outrigger spars 110, is fitted with two spaced stoppers 136 which may be large discs, one being located on either side of the center line of the breasting-in rig 12. It may be desirable that each of the stoppers be brightly colored so as to be more easily observed by a pilot taxiing a flying boat into the bay 111 defined by the spread outrigger spars 110.

The aircraft is then taxied, at a speed sufficient to maintain steerage, into the bay 111 defined by the free ends of the outrigger spars. Preferably, the pilot will approach the breasting-in rig along a course approximating the center line of the breasting-in rig 12 and the beaching cradle 10, although an exact alignment is frequently somewhat difficult to maintain because of wind, current, and tide conditions. As shown in Figure 1, it is within the contemplation of this invention that the keel of the flying boat 14 be equipped with a depending retractable or releasable hook 138 which will engage the retarding cable 120 when the plane enters the bay 111. Preferably, this hook is located at or near the longitudinal center of gravity of the aircraft 14. If the plane comes into the bay 111 on a course roughly commensurate with the center line of the assembled beaching apparatus and engages the retarding cable 120, the latter will be stressed by the inertia of the aircraft. At this time the stressing winches 124 selectively play out enough cable to maintain the cable tension well below the strength limitation thereof. Some of the tension forces acting upon the retarding cable are transmitted, by sheaves 122, to the outrigger spars 110, and these forces tend to draw the ends of the spars together, or, stated otherwise, urge the spars from their diverging relation toward a parallel relation. Such movement of the spars is resisted by their own inertia, by the resistance of the water and by the yielding tension means, engaged with the lever 80 on the cradle 10, here illustrated as the piston 84 of the pneumatic cylinder 86. It will, therefore, be seen that the retarding cable 120 will gently, but firmly, decelerate and then stop the aircraft. When the aircraft has stopped, or has had its speed sufficiently reduced, the pilot can retract or release the hook 138, by any suitable means forming no part of this invention, to release the retarding cable 120 and then taxi into the well 18 of the beaching cradle 10.

If it so happens that the pilot is unable to make a perfect straight-in approach to the breasting-in rig 12, that is to say, due to winds, currents, tides, or other adverse conditions, the plane 14' enters the bay 111 in a direction oblique to the center lines of the beaching apparatus, the hook 138 will engage the retarding cable 120 and ride along it until the stopper disc 136 secured thereto causes the transverse travel of the hook, and hence the aircraft, to stop. This stoppage, in turn, causes the nose of the flying boat 14' to swing toward the entrance 87 of the cradle 10 because of the combination of the tension in retarding cable 120 and the inertia of the forward motion of the flying boat 14'. During this swinging movement, the tension of the retarding cable 120, maintained by the stressing winches 124, will continue to decelerate the speed of the flying boat. At the same time, and through the same forces, the outrigger spars are drawn together, one obviously faster than the other, until a lug 140 stops the movement of each of the L-shaped levers 80. When both levers 80 have been stopped by their corresponding lugs 140, the outrigger spars 110 are substantially parallel and form an aisle of approximately the same width as the opening between the fenders 89. As best shown in Figure 1, the spars are maintained at a level below that of the hull 20 of the flying boat 14, so that, as to the flying boat, it is the fender cables 128 that form the aisle. The resiliently mounted fender cables 128 bear against the hull 20 and cause the flying boat 14 to register its center line with that of beaching cradle 10. The pilot then manipulates the hook 138 to release the retarding cable 120 and slowly taxies the aircraft into the well 18 of the cradle 10.

As the aircraft approaches a desired position within the cradle 10, the pilot drops or resets the releasing hook 138 and the latter engages the operating cable 70 which is, as has been discussed hereinabove, connected to a valve 74 of the air flask 68 in such a manner that sufficient tension on the cable 70 will open the valve to supply compressed air to the pneumatic cylinders 38 and 44 and to the inflating chock 32. It will now be readily seen that the operation of the chocking levers 30, the shores 42, together with the inflation of the pneumatic chock 32, will serve to secure the aircraft in a fixed position relative to, and within, the beaching cradle 10.

It is within the contemplation of this invention that the air flask valve 68 be also connected to pneumatically operate releasing means on the anchor cable latches 92, as well as to operate the pneumatic retracting means on the pins 88 on the L-shaped levers 80. However, it will be readily seen that the anchor cable latches 92 and the pins 88 may be separately operated by other mechanism, or by hand.

When the beaching cradle 10, with the flying boat 14 securely fixed therewithin, is detached from both the anchor cable 90 and the breasting-in rig 12, the pilot can selectively maneuver the aircraft (and the cradle) by following the normal taxiing procedures, that is to say, by the proper application of power of one or more of the engines of the flying boat. The aircraft is taxied directly to, and up, the marine ramp 16, as shown in Figure 3, to the desired service area.

It is within the contemplation of this invention that all of the wheels 24, 26 and 28 of the beaching cradle 10 be supplied with conventional brakes, whether hydraulic or otherwise, and that the front wheels 28 be provided with some conventional steering means. A flexible control cable 152, containing one or more hydraulic pressure conduits, and having sufficient length to reach the pilot's cockpit, is fitted to a suitable fitting 154 on the beaching cradle 10 so that the pilot can selectively operate both the brakes and the steering means.

It is, of course, within the contemplation of this invention that all of the pneumatically operated equipment be provided with conventional auxiliary means for hand operation so that a failure of the pneumatic system will not render the apparatus inoperative or unsafe.

When it is desired to return the flying boat to the water, the aircraft 14 and the beaching cradle 10 are merely taxied down the ramp 16, with control being maintained by suitable application of the brakes on the wheels 24, 26 and 28 and by proper control and operation of the aircraft's engines if reversing pitch propellers are installed. When the aircraft and the cradle are completely water-borne, the pressure on the cylinders 38 and 44 and the pneumatic chock 32 may be relieved so as to free the aircraft of its engagement with the cradle. The aircraft is then taxied, in a conventional manner, out of the well 18 and then proceeds on its way in the ordinary manner.

The beaching cradle may then be towed back to the anchored breasting-in rig 12 and secured thereto by pins 88, in the manner that has been described hereinabove, and the outrigger spars are then spread, as described, by the action of pneumatic cylinder 86, so that the breasting-in rig is prepared to receive another flying boat.

Having described only a typical preferred form and application of my invention, I do not wish to be limited or restricted to specific details herein set forth but wish to reserve to myself any variations or modifications that may appear to those skilled in the art and falling within the scope of the following claims:

I claim:

1. Apparatus for beaching water-borne craft including the combination of a beaching cradle; flotation means secured to said cradle and having sufficient buoyancy to support said cradle in a semi-submerged position in water; wheel means mounted to depend from said cradle; means for securing water craft within said cradle; outrigger means detachably secured to said cradle and extending therefrom to define a converging bay and to guide water craft toward said cradle; cable means mounted on said outrigger means and spanning the bay defined thereby at a level to engage water craft entering the bay to decelerate the water craft and to guide said water craft into said cradle.

2. Apparatus for beaching water-borne craft including the combination of a beaching cradle; flotation means secured to said cradle and having sufficient buoyancy to support said cradle in a semi-submerged position in water; wheel means mounted to depend from said cradle; means for securing water craft within said cradle; outrigger means detachably secured to said cradle and divergingly extending therefrom to define a bay and to guide water craft toward said cradle; an outrigger positioning means mounted on said cradle and engageable with said outrigger means and being selectively operable to vary the position of said outrigger means to vary the size and shape of the bay formed thereby; cable means mounted on said outrigger means and spanning the bay defined thereby at a level to engage water craft entering the bay to decelerate the water craft and to guide the water craft into said cradle.

3. Apparatus for beaching water-borne craft including the combination of a beaching cradle; flotation means having sufficient buoyancy to support said cradle in a semi-submerged position in water; wheel means mounted to depend from said cradle; means for securing water craft within said cradle; outrigger means detachably secured to said cradle and extending therefrom to define a bay; an outrigger positioning means mounted on said cradle and engageable with said outrigger means and being selectively operable to yieldingly vary the position of said outrigger means to vary the size and shape of the bay formed thereby; cable means mounted on said outrigger means and spanning the bay defined thereby at a level to engage water craft entering the bay; selectively variable tension means secured to said cable means; stop means fixed to that portion of the cable means spanning the bay defined by the outrigger means to retard lateral movement of water craft engaged with said cable means relative to said cradle; said tension means and said stop means and said outrigger positioned means being operable to decelerate water craft entering the bay and engaging the cable means and to guide such water craft into said cradle.

4. Apparatus for beaching water craft including the combination of a beaching cradle; flotation means having sufficient buoyancy to support said cradle in a semi-submerged position in water; said cradle defining a well for receiving water-borne water craft when said cradle is in the water; wheel means mounted to depend from said cradle; means for securing water craft within said cradle; outrigger means detachably secured to said cradle and extending therefrom to define a bay having one end substantially equal in width to the width of the well of said cradle; cable means mounted on said outrigger means and spanning the bay defined thereby at a level to engage water-borne craft entering the bay to decelerate such water craft and to guide such water craft into said cradle; fluid pressure means arranged to actuate said securing means; fluid pressure means actuating means disposed within said well and located to be engaged by, and moved to an operative position by, the entry of water craft into the well.

5. Apparatus for beaching water craft including the combination of a beaching cradle; flotation means having sufficient buoyancy to support said cradle in a semi-submerged position in water; said cradle defining a well for receiving water-borne water craft when the cradle is in the water; a plurality of sets of tandem wheel means mounted to depend from said cradle; means for securing water craft within said cradle; outrigger means detachably secured to said cradle and extending divergingly therefrom to define a bay having one end substantially equal in width to the width of the well of the cradle; cable means mounted on said outrigger means and spanning the bay defined thereby at a level to engage water-borne craft entering the bay to decelerate such water craft and to guide such water craft into said cradle; said securing means comprising a second cable means extending laterally across the well and positioned to be engaged and drawn taut by the entrance of water craft therein, a fluid motor operable to actuate said securing means, a fluid pressure source, actuating valve means operable to connect said fluid pressure source to said fluid motor, said second mentioned cable means being engaged with said valve means to operate the latter upon experiencing a predetermined tension.

6. The structure defined in claim 5 in which the securing means comprises chock means located within the well defined by the cradle and mounted to be selectively movable generally upward to engage the undersurface of the water craft.

7. The combination defined in claim 5 in which the securing means comprises inflatable cells mounted within the well of the cradle and having an inflated size and shape to engage and support the undersurface of water craft located within the well and to remain clear of such water craft when at least partially deflated.

8. The combination defined in claim 5 in which the securing means comprises shore means mounted on the cradle and movable generally laterally thereof to engage the sides of the hull of the water craft located within the well of the cradle.

9. The combination defined in claim 5 in which said securing means comprises chock means located within the well defined by the cradle and mounted to be movable generally upward to engage the undersurface of the water craft; inflatable cells mounted within the well of the cradle and having an inflated size and shape to engage and support the undersurface of water craft located within the well and to remain clear of such water craft when at least partially deflated; and shore means mounted on said cradle and movable generally laterally thereof to engage the sides of the hull of the water craft located within the wall of the cradle.

10. Apparatus for beaching water-borne craft including the combination of a beaching cradle; flotation means secured to said cradle and having sufficient buoyancy to support said cradle in a semi-submerged position in water; wheel means mounted to depend from said cradle; means for securing water craft within said cradle; outrigger means detachably secured to said cradle and extending therefrom to define a converging bay and to guide water craft toward said cradle; cable means mounted on said outrigger means and spanning the bay defined thereby at a level to engage water craft entering the bay to decelerate the water craft and to guide said water craft into said cradle; means for engaging said securing means with the water craft in response to the entry of water craft into said cradle.

11. Apparatus for beaching water-borne craft including the combination of a beaching cradle; flotation means secured to said cradle and having sufficient buoyancy to support said cradle in a semi-submerged position in water; wheel means mounted to depend from said cradle; means for securing said water craft within said cradle; outrigger means detachably secured to said cradle and extending therefrom to define a converging bay and to guide water craft toward said cradle; cable means mounted on said outrigger means and spanning the bay defined thereby at a level to engage water craft entering the bay to decelerate the water craft and to guide said water craft into said cradle; fluid pressure means arranged to actuate said securing means; fluid pressure means actuating means disposed within said cradle and located to be engaged by, and moved to an operative position by, the entry of water craft into the well.

12. A breasting-ing rig for decelerating water-borne craft and for guiding such craft into the mouth of a relatively narrow channel comprising a pair of spaced outriggers defining a bay therebetween; said outriggers having one pair of corresponding ends spaced at a distance approximately equal to the width of the mouth of the channel; outrigger positioning means for selectively yieldingly controlling the angular relationship of said outriggers to vary the size and shape of the bay defined thereby; cable means mounted on each of said outriggers and spanning the bay defined thereby at a location remote from the above mentioned ends, and at a level to engage water craft entering the bay; winch means engaged by said cable means and operable to selectively lay out the cable means upon experiencing a predetermined tension force in said cable means.

13. A breasting-in rig for decelerating water-borne craft and for guiding such craft into the mouth of a relatively narrow channel comprising a pair of spaced outriggers defining a bay therebetween; said outriggers having one pair of corresponding ends spaced at a distance approximately equal to the width of the mouth of the channel; flotation means to maintain each of said outriggers at a level near the surface of the water; outrigger positioning means for selectively yieldingly controlling the angular relationship of said outriggers to vary the size and shape of the bay defined thereby; cable means mounted on each of said outriggers and spanning the bay defined thereby at a location remote from the above mentioned ends, and at a level to engage water craft entering the bay; winch means engaged by said cable means and operable to selectively lay out the cable means upon experiencing a predetermined tension force in said cable means; stop means mounted on that portion of the cable means spanning the bay defined by said outrigger means to retard lateral movement of water craft engaged with said cable means relative to the mouth of the channel; said winch means, said stop means and said outrigger positioning means being operable to decelerate water craft entering the bay and engaging the cable means and to guide said water craft into said channel.

References Cited in the file of this patent

UNITED STATES PATENTS 2,049,702    Howe                  Aug. 4, 1936
2,594,773    Harris                Apr. 27, 1952